United States Patent
Simmonds et al.

(10) Patent No.: US 9,618,751 B2
(45) Date of Patent: Apr. 11, 2017

(54) HEAD MOUNTED DISPLAY

(71) Applicant: BAE SYSTEMS plc, London (GB)

(72) Inventors: Michael David Simmonds, Kent (GB); Mohmed Salim Valera, Kent (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 14/467,696

(22) Filed: Aug. 25, 2014

(65) Prior Publication Data
US 2014/0362447 A1 Dec. 11, 2014

Related U.S. Application Data

(63) Continuation of application No. 13/266,986, filed as application No. PCT/GB2010/050683 on Apr. 27, 2010, now Pat. No. 8,842,368.

(30) Foreign Application Priority Data

Apr. 29, 2009 (EP) ..................................... 09275031
Apr. 29, 2009 (GB) .................................. 0907345.3

(51) Int. Cl.
*G02B 27/01* (2006.01)
*G02B 27/42* (2006.01)
(Continued)

(52) U.S. Cl.
CPC ..... *G02B 27/0172* (2013.01); *G02B 27/4205* (2013.01); *G02B 27/4272* (2013.01);
(Continued)

(58) Field of Classification Search
CPC .............. G02B 27/017; G02B 27/0172; G02B 2027/0123
(Continued)

(56) References Cited

U.S. PATENT DOCUMENTS 4,582,389 A  4/1986 Wood et al.
5,396,349 A  3/1995 Roberts et al.
(Continued)

FOREIGN PATENT DOCUMENTS

DE  10 2007 021 036 A1  11/2008
EP   1 731 943 A1  12/2006
(Continued)

OTHER PUBLICATIONS

International Search Report dated Jun. 17, 2010 issued in PCT/GB2010/050683.
(Continued)

*Primary Examiner* — Scott J Sugarman
*Assistant Examiner* — Gary O'Neill
(74) *Attorney, Agent, or Firm* — Scully, Scott, Murphy & Presser, P.C.

(57) ABSTRACT

A head-mounted or helmet-mounted display apparatus is provided. The apparatus includes an optical element which in use is disposed in front of the eyes of a user. The optical element has a waveguide portion. The apparatus further includes a light source of image-bearing light and two diffraction elements. Each diffraction element is configured for propagation of image-bearing light of the light source through the optical element. Each diffraction element is arranged to release the image bearing light from the optical element. The apparatus further includes a switching element for switching the image-bearing light repeatedly between the first diffraction element and the second diffraction element to provide a first visible image or a second visible image to the respective eye of a user.

12 Claims, 7 Drawing Sheets

Figure 1A:
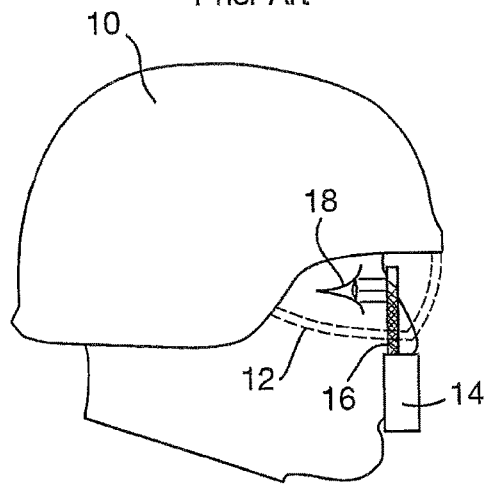

(51) Int. Cl.
*G02B 27/44* (2006.01)
*G02B 5/02* (2006.01)

(52) U.S. Cl.
CPC ............. *G02B 27/44* (2013.01); *G02B 5/02* (2013.01); *G02B 2027/0123* (2013.01)

(58) Field of Classification Search
USPC ..... 345/7–9; 359/13, 14, 630, 631, 632, 633
See application file for complete search history.

(56) References Cited

U.S. PATENT DOCUMENTS

| | | | |
|---|---|---|---|
| 5,543,968 | A | 8/1996 | Freeman et al. |
| 5,752,276 | A | 5/1998 | Baudou et al. |
| 6,577,411 | B1 | 6/2003 | David |
| 2003/0030597 | A1* | 2/2003 | Geist ............ G02B 27/0172 345/8 |
| 2003/0086135 | A1 | 5/2003 | Takeyama |
| 2007/0188837 | A1 | 8/2007 | Shimizu et al. |

FOREIGN PATENT DOCUMENTS

| | | |
|---|---|---|
| EP | 2 065 751 A2 | 6/2009 |
| WO | WO 2006/064301 A1 | 6/2006 |
| WO | WO 2007/029032 A1 | 3/2007 |

OTHER PUBLICATIONS

European Search Report dated Sep. 8, 2009 issued in EP 09 27 5031.
UK Search Report dated Jun. 23, 2009 issued in GB0907345.3.
International Preliminary Report on Patentability and Written Opinion, dated Nov. 10, 2011 from related International Application No. PCT/GB2010/050683.
U.S. Office Action dated Dec. 3, 2012 issued in U.S. Appl. No. 13/266,986.
U.S. Final Office Action dated May 30, 2013 issued in U.S. Appl. No. 13/266,986.
U.S. Final Office Action dated Nov. 15, 2013 issued in U.S. Appl. No. 13/266,986.
Notice of Allowance dated May 9, 2014 issued in U.S. Appl. No. 13/266,986.

* cited by examiner

WFOV flat waveguide display

WFOV curved waveguide

HEAD MOUNTED DISPLAY

CROSS REFERENCE TO RELATED APPLICATIONS

The present application is a continuation application of U.S. Ser. No. 13/266,986, filed Oct. 28, 2011, which is the National Phase of PCT/GB2010/050683 filed Apr. 27, 2010 which claims the benefit of priority of Great Britain Patent Application No. GB 0907345.3 filed Apr. 29, 2009 and European Patent Application No. EP 09275031.4 filed Apr. 29, 2009, the entire contents of which are incorporated herein by reference.

This invention relates to a head-mounted display apparatus, in which a display is provided on a surface through which a wearer of the apparatus views the outside world. Included in the term "head-mounted display apparatus" are visors, goggles and spectacles worn directly on the head, and also such articles carried indirectly on the head by being mounted on a helmet, or other head gear. It also includes visors, goggles and viewing windows which are built into helmets or other head gear.

The invention is applicable to equipment worn by military personnel, in particular infantrymen and crews of armoured fighting vehicles, aircrew and other airborne personnel (whether civil or military) who wear helmets, divers, and other personnel to whom visual information must be transmitted under difficult conditions. Examples are fire-fighters and other emergency services personnel, and the police.

The invention may also be applicable to head-mounted virtual reality display apparatus, in which a display is provided to a wearer of the apparatus via a surface which obscures his view of the outside world.

Prior art head-mounted display apparatus employs a flat waveguide between the user's eye and a visor of a helmet, which waveguide acts as a combiner and expands a pupil of image-bearing light to present an image to the user. These displays must be made small and compact because they must fit into the restricted space between the user's eye and the helmet, and this can lead to cost and complexity.

In other known apparatus, images are projected onto the inner surface of a visor and reflected from it so as to be visible to the wearer.

Precise positioning of the apparatus on the head is necessary for these devices to work. This is not always achievable especially when the helmet may have to be donned quickly under field conditions, e.g. when used by ground troops.

The present invention seeks to provide alternatives to these prior art solutions, which may avoid some of the disadvantages thereof.

For example, disclosed is a head-mounted or helmet-mounted display apparatus. The apparatus includes an optical element which in use is disposed in front of the eyes of a user. The optical element has a waveguide portion. The apparatus further includes a light source of image-bearing light and two diffraction means. The first diffraction means is configured for propagation of image-bearing light of the light source through the optical element. The first diffraction means is arranged to release the image bearing light from the optical element. The second diffraction means is configured for propagation of image-bearing light of the light source through the optical element. The second diffraction means is arranged to release the image bearing light from the optical element. The apparatus further includes a switching means for switching the image-bearing light repeatedly between the first diffraction means and the second diffraction means to provide the first visible image or the second visible image to a respective eye of a user.

The optical element and the first diffraction means may have optical powers such that the released light provides the first visible image to one of the user's eyes.

The optical element and the second diffraction means may have optical powers such that the released light provides the second visible image to the other of the user's eyes.

Additionally, a head-mounted or helmet-mounted display apparatus comprising an optical element which in use is disposed in front of an eye of a user and which is curved in both azimuth and elevation relative to the eye and configured to operate as a waveguide, a source of image-bearing light, and diffraction means for propagation of image-bearing light through the optical element and for releasing the image-bearing light from the optical element, optical element and the diffraction means having optical powers such that the released light provides a viable image to the user's eye.

As noted above, in many embodiments of the invention, the curved optical element may be a transparent element through which the user views the outside world.

The image-bearing light may be introduced into the optical element for propagation therethrough via an input reflective, diffractive or transmissive element.

The diffraction means may comprise an input diffractive element and an output diffractive element.

At least the output diffractive element may have spherical optical power in azimuth and elevation relative to the user's eye.

The spherical optical power may be provided by non-parallel diffractive features of the output diffractive element.

The diffractive features may comprise a curved grating or other curved diffractive component.

The output diffractive element may have an angular bandwidth which is less than the angular field of view of the visible image provided to the user's eye, the angle of diffraction of the output diffractive element varying across the element so as to present the image to the user's eye.

Preferably an optical axis of a waveguide formed within the optical element lies in a plane containing a sagittal axis of symmetry of the optical element and an eye of the user.

The source of image-bearing light may comprise a display panel and means for illuminating it, or a self-illuminating display panel.

Preferably the optical powers of optical element and the diffraction means are such that image bearing light passes from the image-bearing light source to the input diffractive element of the diffraction means without being acted upon by an element having optical power.

The apparatus may comprise further said diffraction means configured with the optical element to provide a visible image to the user's other eye.

The apparatus may comprise a respective image-bearing light source for each diffraction means, the light source being dispersed such that relative angular movement of the light sources about an axis of symmetry of the optical element adjusts the inter-pupillary spacing of the images presented to the users eyes.

Alternatively, there may be a common light source for each diffraction means, and means for switching the image-bearing light repeatedly between the first and further diffraction means whereby to provide a visible image to each of the user's eyes. The switching means may be an input element which is common to the first and further diffraction means, and switchable between them.

The image-bearing light source may be configured to modify the image synchronously with switching of the image-bearing light whereby to provide a pair of binocular images to the user's eyes.

Figure 1B:
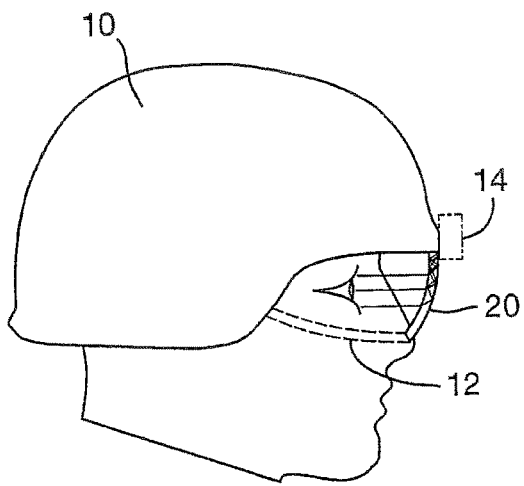
Figure 1C:
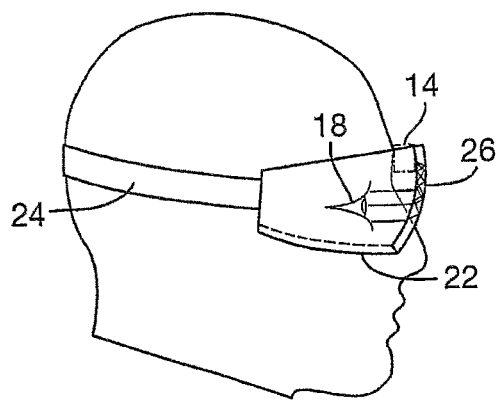
Figure 1D:
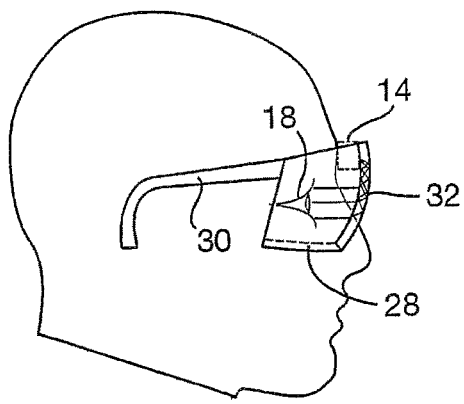
Figure 2A:
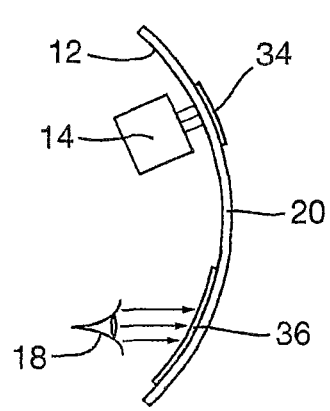
Figure 2B:
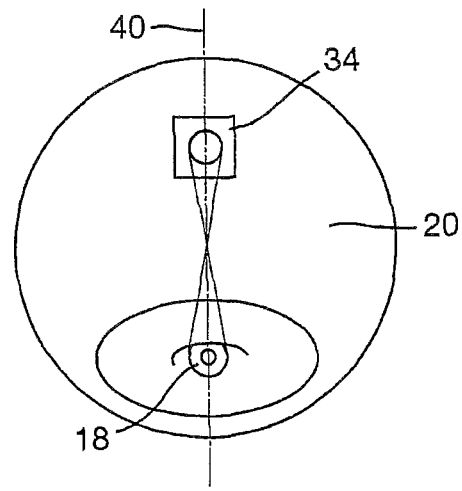
Figure 2C:
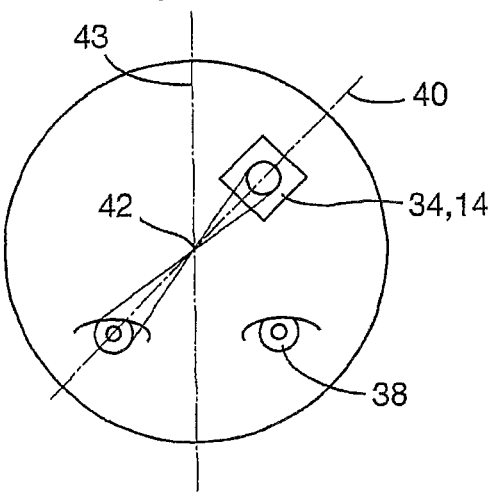
Figure 6A:
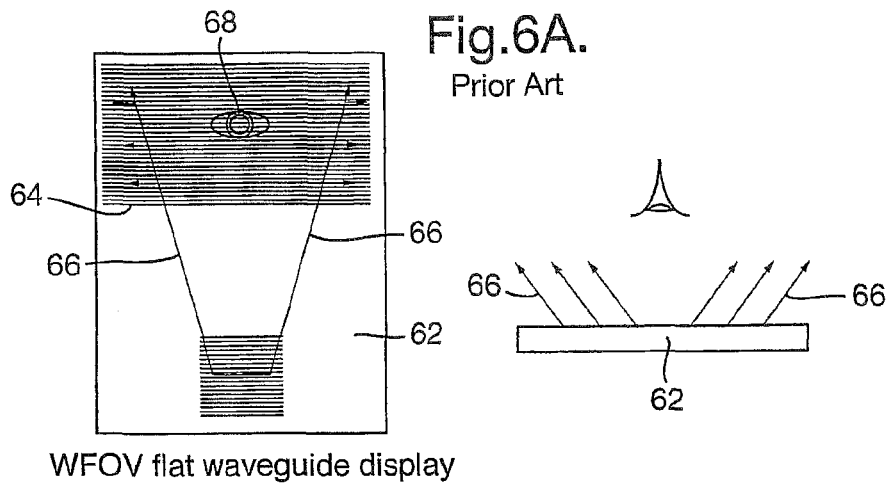
Figure 6B:
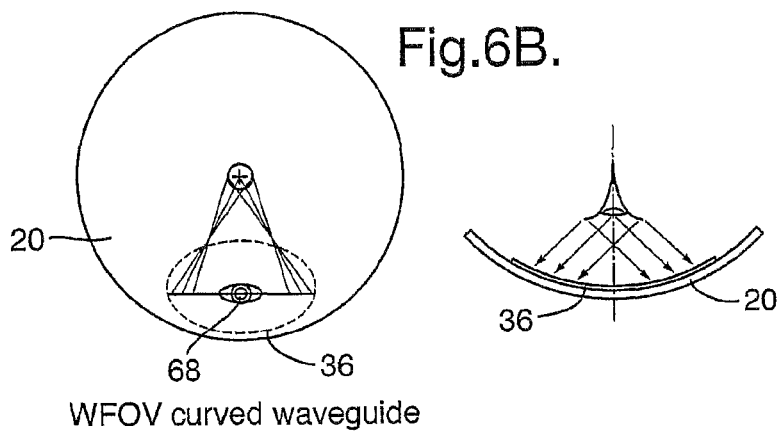
Figure 7A:
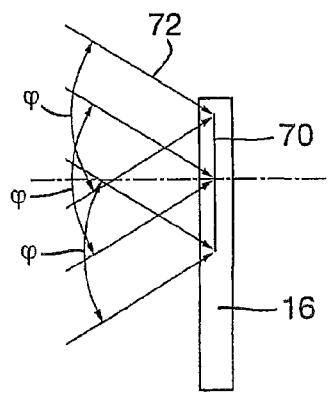
Figure 7B:
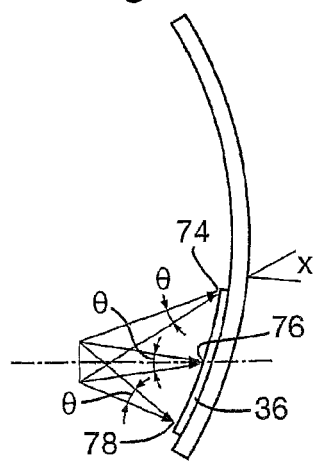
Figure 8:
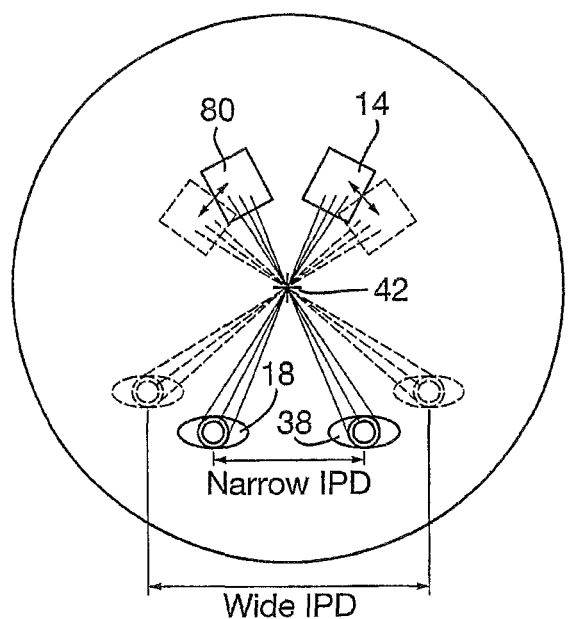
Figure 9:
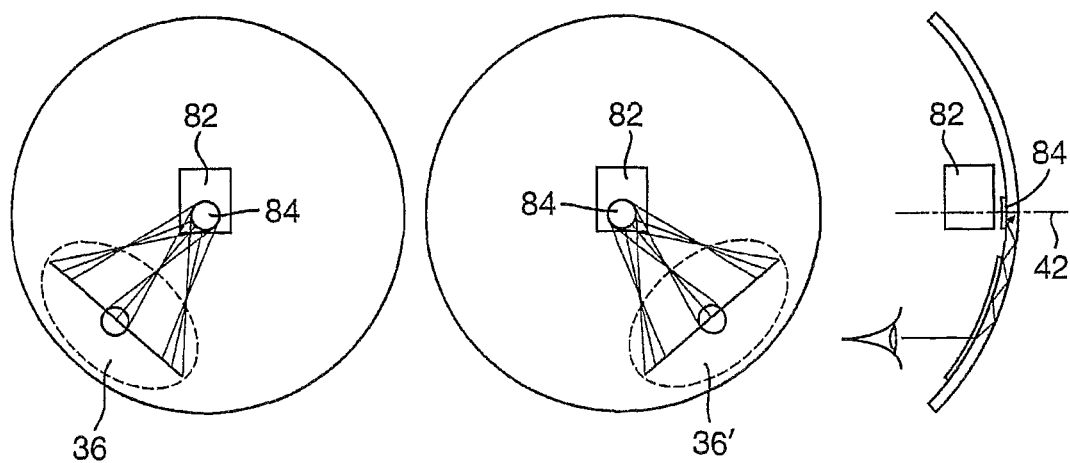

The invention will now be described merely by way of example with reference to the accompanying drawings, wherein FIG. 1A, 1B, 1C and 1D show various forms of head-mounted apparatus, of which FIG. 1A in prior art and FIGS. 1B, 10 and 1D are according to the invention;

FIGS. 2A and 2B are diagrammatic side and front views of the embodiment of FIG. 1B, and FIG. 2C in a variation of the embodiment of FIG. 2B;

FIGS. 3A and 3B, and 4A, 4B and 4C illustrate a principle used in the invention;

FIGS. 5A to 5D illustrate various embodiments of the invention;

FIGS. 6A, 6B, 7A and 7B explain features of the invention, FIGS. 6A and 7A being prior art, and FIGS. 8 and 9 illustrate further embodiments of the invention.

Referring to FIG. 1A, a soldier is shown wearing a helmet 10 having a curved visor 12, through which he views the outside world. Supported from the helmet by structure not shown is a light source 14 from which projects upwards a flat slab-like waveguide 16, which is disposed under the visor in front of the user's eye 18. An image from the source 14 is propagated through the waveguide and diffracted out to the user's eye as a visible image. Whilst effective, this arrangement can be costly, and the presence of the waveguide close to the user's eye can present a hazard.

In an embodiment of the invention shown in FIG. 1B, part 20 of the curved visor of the helmet is itself used as the waveguide. The light source 14 is shown here mounted outside the helmet, but it can be placed inside subject to space being available, and to it being located so as not to present a hazard to the user.

This concept can be extended to cases where a protective helmet is not necessary, or can be worn separately from the display apparatus. Thus in FIG. 10, a pair of goggles, which can be worn alone or under a visorless helmet, comprises a curved visor 22, held onto the user's head by an elasticated strap 24. A portion 26 of the visor is configured to operate as a waveguide, receiving image-bearing light from a source 14 and delivering it to the user's eye 18. Similarly in FIG. 1 D, the curved lens portions 28 of a pair of spectacles 30 include a waveguide portion 32 driven by a light source 14 to deliver an image to the user's eye 18.

Referring to FIGS. 2A and 2B, the visor 12 of FIG. 1B comprises an input diffractive element or grating 34, an output diffractive element or grating 36 angularly spaced from the input element vertically around the visor. The waveguide portion 20 of the visor lies between the input and output diffractive elements. The light source 14 delivers image-bearing light to the input element 34, from which it propagates through the waveguide portion 20, under total internal reflection, to the output element 36 at thence is delivered to the user's eye 18. FIG. 2C shows a preferred arrangement in which the light source 14 is diagonally offset around the visor so that it is disposed above the other eye 38 of the user. The waveguide portion, the axis of which is shown at 40 in FIG. 2C passes through an axis of symmetry 42 of the waveguide portion 20 of the visor 14, lying in the mid-sagittal plane 43 of the user's head. The visor, at least in this region, is of spherical shape, and is symmetrical about the mid-sagittal plane 43. This allows the use of a single continuous curved visor structure rather than having to deploy a visor made of several non-continuous surfaces. In addition to spherically shaped visors, the waveguide guide may have different radii of curvature in azimuth and elevation.

Figure 3A:
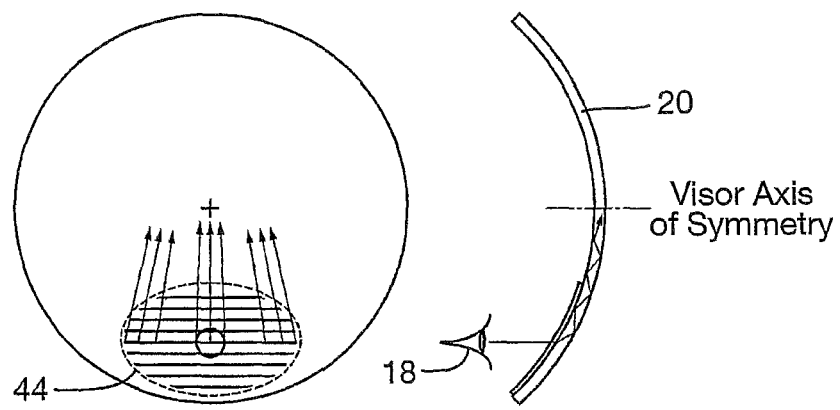
Figure 3B:
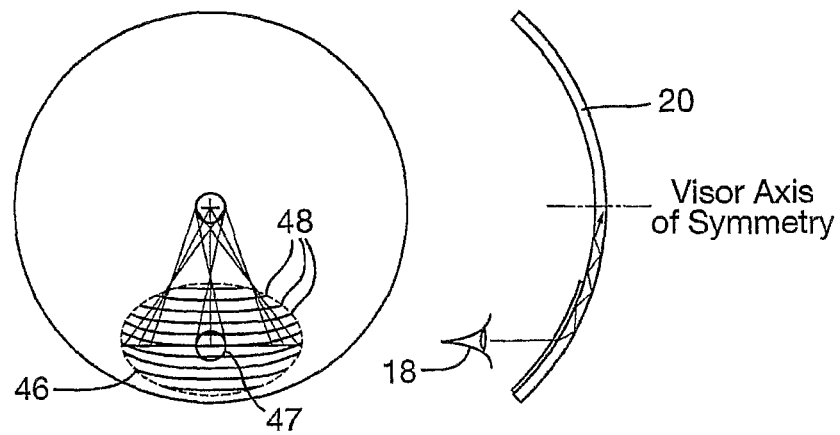

The invention requires a pupil of image-bearing light to be conveyed from the image source to the user's eye. This is achieved by supplementing the optical power inherent in the curvature of the waveguide portion 20 of the visor 14 (it is of constant thickness between parallel curved surfaces) with optical power in at least the output diffracting element 36, and if appropriate in the input diffracting element as well. In this embodiment, the extra optical power is obtained by adding spherical power in the azimuthal plane of the output diffractive element 36 in front of the eye. Thus the spherical power is provided in both azimuth and elevation relative to the user's eye 18. Referring to FIG. 3A, here it is illustrated that a conventional straight-ruled grating 44 would not converge diffracting light to a pupil at the user's eye. If the grating instead has increased spherical power, as showing at 46 in FIG. 3B, convergence to a pupil at the eye is achieved. The spherical power is provided by curving the grating lines 48 upwards gradually across their length and varying their spacing relative to the centre of the grating, thereby providing a diffractive component orthogonally to the main sideways extent of the grating lines.

Figure 4A:
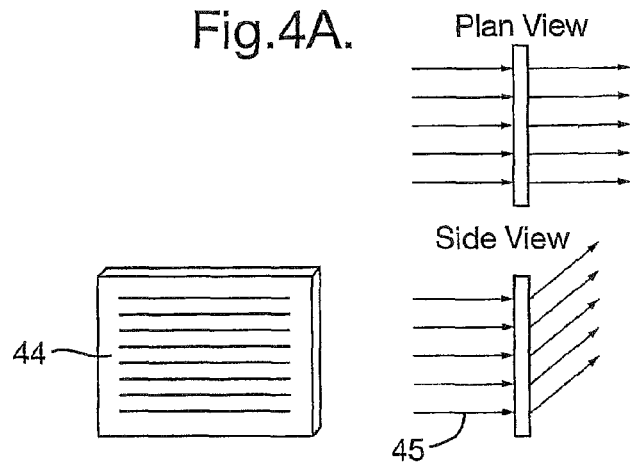
Figure 4B:
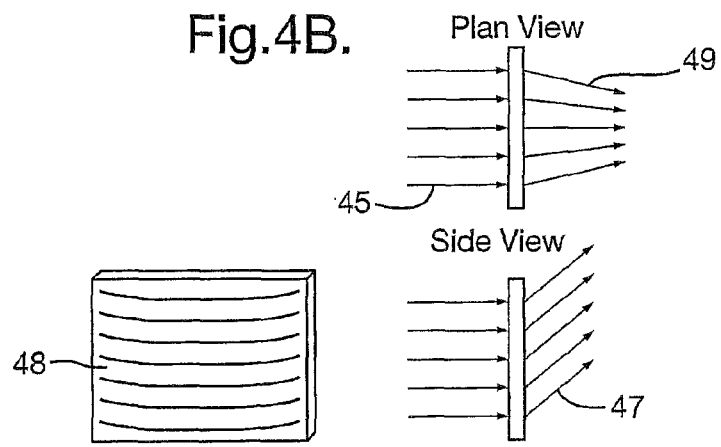
Figure 4C:
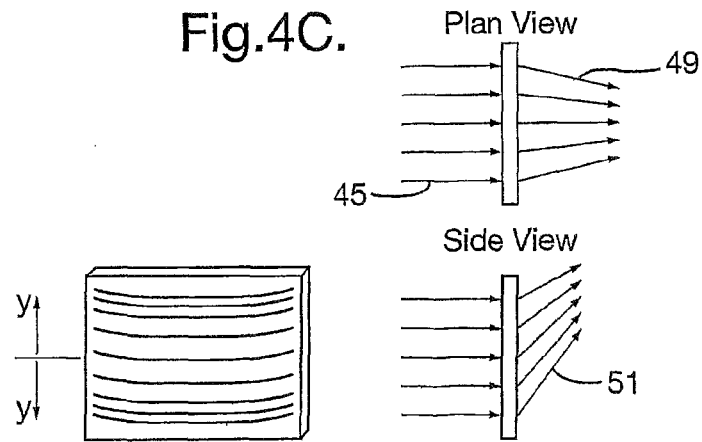

In more detail, FIG. 4A shows how the conventional grating 44 of FIG. 3A diffracts parallel rays of light 45 incident anywhere on its surface through the same angle so that they remain parallel after diffraction. In other words the grating has zero optical power (infinite focal length). In FIG. 4B, the grating lines 48 are curved upwards, whilst maintaining the same even spacing as the grating lines 44 of FIG. 3A. Incident parallel rays remain parallel after diffraction when viewed in elevation as at 47, but are convergent when viewed in the azimuthal plane. When additionally the spacing of the grating lines is reduced as a function of the distance y from the horizontal centre line of the grating (FIG. 4C), parallel incident rays also are convergent after diffraction in the elevational plane. Thus the grating can be given spherical and/or cylindrical optical power.

By applying these principles to the grating lines of the output and/or input diffractive elements 36, 34, these elements can be given optical power in either or both of the azimuthal and elevational planes (i.e. spherical and/or cylindrical optical power). The necessary curvature and spacing of the grating lines can be determined either by optical calculation methods or by iterative simulation. The portion 20 of the visor which acts as a waveguide is of part-spherical shape and of constant thickness. It thereby has spherical optical power with respect to light propagating through it from the input to the output diffractive elements.

The optical powers of the waveguide and these two elements are chosen and combined using optical calculation methods or by iterative simulation so that the elements 34, 20 and 36 behave as a lens system to deliver a visible image to the user's eye.

Figure 5A:
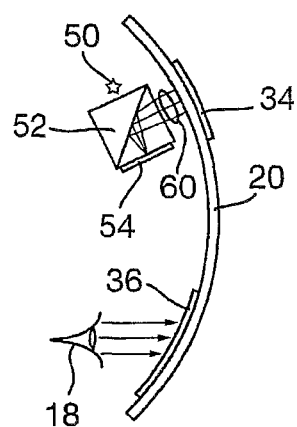

FIGS. 5A to 5D show various forms of image-generating light sources which may be used in the invention. In FIG. 5A, light from a point source 50 passes through a beam splitter 52 to illuminate the surface of a reflective display panel 54. Light reflected from the panel, now image-bearing, is reflected at the beam splitter through a focussing lens 60 to the input diffracting element 34 at thence to the user's eye 18 as already described.

Figure 5B:
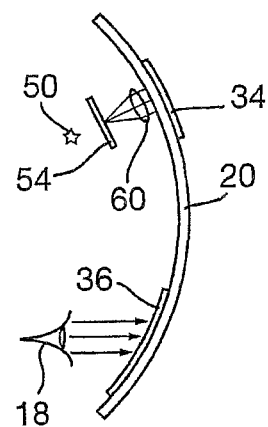

In FIG. 5B the display panel 54 is transmissive rather than reflective. Light from the source 50 passes through the display panel and the lens 60 to the input diffracting element 34 as before.

Figure 5C:
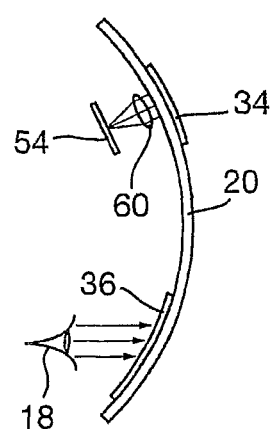

In FIG. 5C the display panel 54 is self-illuminated. For example it may be an organic light emitting diode matrix. Light from the display passes through the lens 60 to the input diffractive element 34.

In a preferred form of the invention, the functionality of the focussing lens 60 is achieved within the diffracting means 34, 36 and the waveguide 20. For example the focussing power of the lens may be achieved in the input diffracting element 34. The complex optical power of the lens system 60, which would otherwise be used to collimate the image on the display panel 54 into the waveguide can be contained within the input diffracting element 34. Once again this is achieved through the use of a complex diffracting fringe structure that is not just a plane linear grating. The exact power required depends on the shape and form of the curved waveguide and the optical power contained within the output diffracting element 36. Regardless of the exact prescription of this optical power the structure once again contains curved fringes (grating lines) that allow for a bulk diffraction along the prime axis of the waveguide 20 but with a spherical component to give focussing power. This spherical focussing component again curves the fringes to give an azimuth component of diffraction and also contains a variable pitch of fringe in the vertical axis to give a focussing component in the elevation axis.

Figure 5D:
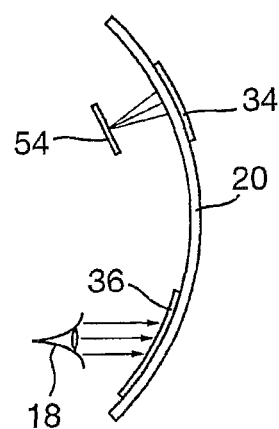

Then as shown in FIG. 5D, the lens 60 can be omitted, simplifying the optical architecture and achieving apparatus of lower mass, volume and complexity.

A typical known flat waveguide display 62 (FIG. 6A) has the capability of allowing a wide field of view in the axis parallel to the diffractive element structure 64. However this waveguide is not pupil-forming and consequently the edge 66 of the field of view does not fall usefully within the exit pupil 68 of the display. Also, an extremely large waveguide would be required to avoid vignetting at the edge of the field of view, leading to difficulties in accommodating it within head or helmet-mounted apparatus. In contrast the optical system of the present invention is pupil-forming, and so a compact display with a wide field of view can be provided as shown in FIG. 6B.

The present invention also can be advantageous in that it can be implemented using only lower angular bandwidth gratings. FIG. 7A is an enlarged view of part of the prior art structure of FIG. 1A. An output diffraction element 70 of the slab waveguide 16 is required to have a full angular bandwidth $\phi$ at every point on the diffraction element if rays 72 at the margins of the field of view are to be resolved within the compass of the user's eye. This brings with it the disadvantage that extraneous light (for example, sunlight) passing through the waveguide 16 from the outside world may couple into the diffractive element and be directed to the user's eye. This can be distracting and may veil the user's view of the display and of the outside world.

In the present invention, however, as shown in FIG. 7B, the output diffractive element 36 may be displaced from the pupil at the user's eye, so that each part of the diffractive element need have only a relatively narrow angular bandwidth $\theta$ centred around the angle at which that part of the element is required to diffract image-bearing light to the user's eye 18. For example the region 74, 76, 78 of element 36 all have the same angular bandwidth, but the spherical power of the element 36 is such that each region diffracts light received from within the waveguide 20 at a different angle so as to deliver it to the user's eye. Thus rays diffracted at region 74 are directed at an angle x to the normal at the surface of the element 36, whereas rays diffracted at region 78 are directed almost normally to the element surface. Rays at region 76 are at an intermediate angle. By limiting the angular bandwidth of the diffractive elements in this manner, less solar energy will be coupled to the eye via the waveguide element.

The invention has so far been described in the context of presenting an image to one eye of the viewer. However it is well adapted for bi-ocular or binocular applications. Thus, FIG. 2C shows an embodiment in which the image source 14 and input diffracting element 34 are disposed over one eye of the user, and an image is transmitted to his other eye. The arrangement can be replicated for the other eye as shown in FIG. 8, where an additional image source 80 provides image bearing light to further input and output gratings arranged to diffract the light diagonally through the central waveguiding part 20 of the visor and thence to the user's other eye 38. The propagation paths of the light passing to the user's eyes 18, 38 intersect on the axis of symmetry 42 of the visor. By making the input and output diffractive elements of each path oversized and optimised, it is possible then to allow for relative rotational movement of the light sources around the axis 42. This permits variations in the inter-pupillary distance (eye spacing) of different wearers of the same apparatus to be accommodated, as illustrated in exaggerated form in FIG. 8. This facility is particularly useful for helmet-mounted equipment which may be used by more than one person, for example by foot soldiers, or where the helmet has to be donned quickly and not always into a repeatable position on the user's head. The images delivered to the user's two eyes can be identical (i.e. a bi-ocular arrangement); this is suitable for the presentation of data. Alternatively, two slightly different images may be prevented (left eye and right eye images) so as to provide a binocular or stereoscopic image giving an impression of depth. Such images for example can be obtained in a night-vision system from a pair of helmet-mounted infra-red cameras. Alternatively, the image can be video or graphical information supplied from elsewhere.

FIG. 9 shows another embodiment which provides bi-ocular or binocular images. There is a single image source 82, and a switchable input diffractive element 84 common to both left and right eye image systems. This element is positioned on the sagittal axis of the visor and has extending from it waveguides 20 through the visor to respective right and left eye output diffractive gratings 36, 36'. In a bi-ocular arrangement, the image source provides continuous image-bearing light to the input diffractive element 84. This element switches the light between the left and right eye paths, typically at about 50-60 Hz to avoid flicker. An identical image thus is provided to both eyes. For binocular images, the image source 82 is switched in synchronisation with the diffractive element 84, and provides slightly different images to each eye.

The invention also includes any novel features or construction of features herein disclosed, regardless of whether specifically claimed. The abstract is repeated here as part of the specification.

A helmet- or head-mounted apparatus has a visor or other curved optical element in front of at least one eye of a wearer, which element also is used as a waveguide. Image-bearing light is injected into the waveguide via an input diffractive element, and propagates through the visor to an output diffractive element which releases the light. The optical powers of the curved waveguide and the input and output diffractive elements are selected so that the released light is delivered as an image to the user's eye.

What is claimed is:

1. A head-mounted or helmet-mounted display apparatus comprising:
    an optical element which in use is disposed in front of the eyes of a user, the optical element comprises a waveguide portion, the waveguide portion which in use is also disposed in front of the eyes of the user;
    a light source of image-bearing light;
    an input element configured to input the image-bearing light to the waveguide portion;
    a first diffraction means for propagation of image-bearing light of the light source through the waveguide portion, the first diffraction means being arranged to release the image bearing light from the waveguide portion, the waveguide portion having optical powers such that the released light provides a first visible image to one of the user's eyes;
    a second diffraction means for propagation of image-bearing light of the light source through the waveguide portion, the second diffraction means being arranged to release the image bearing light from the waveguide portion, the waveguide portion having optical powers such that the released light provides a second visible image to the other of the user's eyes, the waveguide portion including the first diffraction means and the second diffraction means; and
    a switching means for switching the image-bearing light repeatedly between the first diffraction means and the second diffraction means whereby to provide the first visible image or the second visible image to a respective eye of a user.

2. The apparatus of claim 1, wherein the switching means is an input element which is common to both the first diffraction means and the second diffraction means, and switchable between them.

3. The apparatus of claim 1, wherein the light source is configured to modify the image synchronously with switching of the image-bearing light whereby to provide a pair of binocular images to the eyes of the user.

4. The apparatus of claim 3, wherein the pair of binocular images including the first visible image and the second visible image, the first visible image being different from the second visible image.

5. The apparatus of claim 1, wherein the light source comprise a display panel and means for illuminating it, or a self-illuminating display panel.

6. The apparatus of claim 1, wherein the optical element is curved in both azimuth and elevation relative to the eyes of a user.

7. The apparatus of claim 6, wherein the curved optical element is a transparent element through which the user views the outside world.

8. The apparatus of claim 6, wherein an optical axis of a waveguide formed within the optical element lies in a plane containing a sagittal axis of symmetry of the optical element and the eyes of the user.

9. The apparatus of claim 6, wherein each of the first diffraction means and the second diffraction means include an input diffractive element and an output diffractive element.

10. The apparatus of claim 9, wherein at least the output diffractive element has spherical optical power in azimuth and elevation relative to the user's eye.

11. The apparatus of claim 10, wherein spherical optical power is provided by non-parallel diffractive features of the output diffractive element.

12. The apparatus of claim 9, wherein the output diffractive element has an angular bandwidth which is less than the angular field of view of the first visible image or the second visible image which is provided to a respective eye, the angle of diffraction of the output diffractive element varying across the element so as to present the first visible image or the second visible image to the respective eye.

* * * * *